June 9, 1959    L. SELIG    2,889,576
GRANULATING DISC
Filed Feb. 20, 1957    3 Sheets-Sheet 1

(Old Art)

(Old Art)

Inventor:
Ludwig Selig
By Bailey Stephens & Huettig
Attorneys

United States Patent Office 2,889,576
Patented June 9, 1959

2,889,576

GRANULATING DISC

Ludwig Selig, Bergen-Enkheim, Germany, assignor to Metallgesellschaft Aktiengesellschaft, Frankfurt am Main, Germany Application February 20, 1957, Serial No. 641,342

Claims priority, application Germany March 3, 1956

6 Claims. (Cl. 18—1)

This invention relates to a granulating disc. In particular, the invention is directed to an improvement in an inclined circular granulating disc used for making large granular particles from fine grained particles by agglomerating the fine material so that it grows into larger particles.

The objects of the invention are to increase the efficiency of the granulating disc and to produce large granules of uniform size. The invention enables the production of large granules within a close tolerance of diameter at an increased output.

The means by which the objects of the invention are obtained are disclosed more fully with reference to the accompanying drawings, in which.

Figure 1:
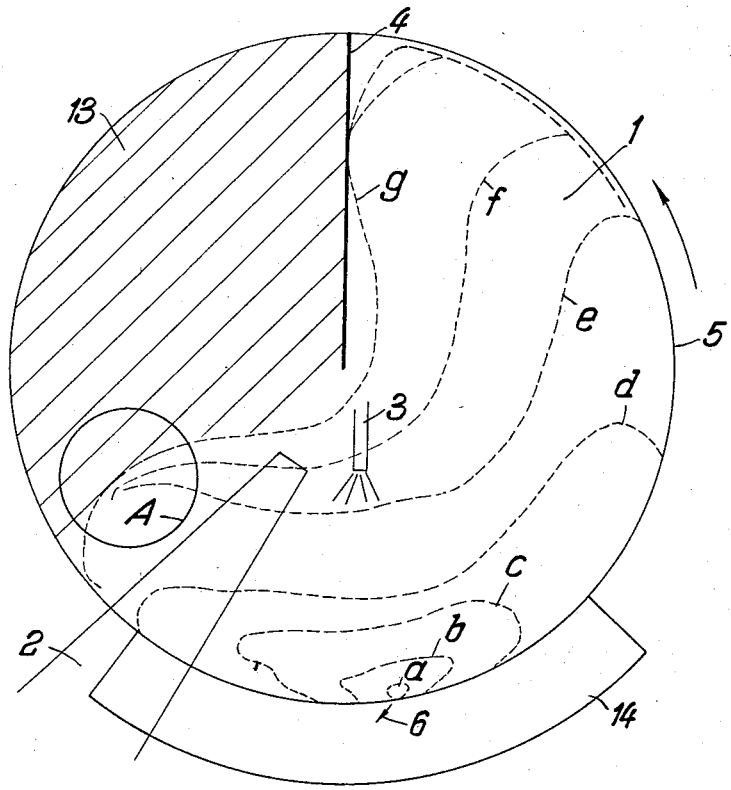
Figure 1 is a plan view of a single scraper blade granulating disc according to the prior art.
Figure 2:
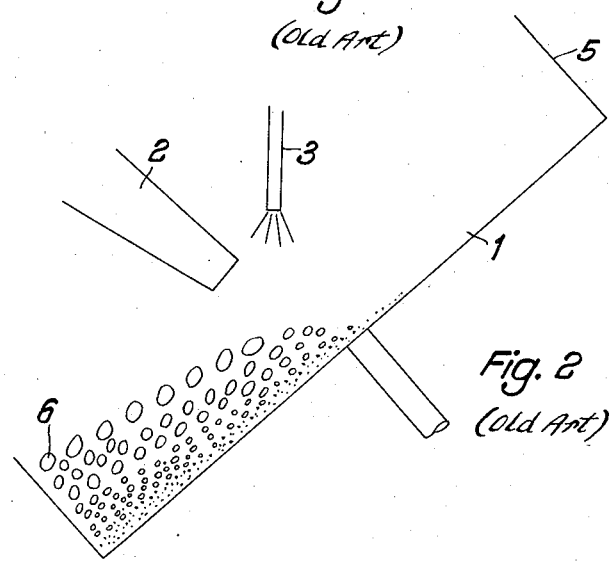
Figure 2 is a diagrammatical cross-sectional view through Figure 1.

As shown in Figures 1 and 2, inclined granulating discs are used for forming large bell-shaped granular particles from fine grained and powdery materials, the fine granular particles being moistened and rotated on the disc. Although cylinders are sometimes used for this purpose, the instant invention is directed to a granulating disc.

The granulating disc is composed of a circular bottom plate 1 mounted on an inclined axis. Fine granular particles or material is fed through the chute 2 upon the disc and moistened by water from pipe spray 3. As the disc revolves, the material is scraped off the plate by the scraper 4 which extends from adjacent the center of the disc to the outer wall 5.

As the disc turns in the direction of the arrow, the moistened material is carried to the highest point at which the scraper 4 is located. This scraper performs a double function. First of all, the scraper cleans the surface of the disc and also the side wall 5 from ungranulated, sticky material. Secondly, it stops the circular travel of the material so that the material rolls down the inclined disc surface. While rolling down, each granular particle picks up additional sticky material, that is the moistened finely granulated particles and enlarges itself. At the same time, new grains are developed by the scraped off fine particles, and each of which also enlarges itself while rolling downwardly.

Grains of various size develop on the disc, and the largest granular particles 6 are discharged over the lower portion of side wall 5. The size of granular particles 6 is dependent upon (a) the degree of inclination of disc 1, (b) the location of chute 2, (c) the speed at which disc 1 is rotated, (d) the height of side wall 5, (e) the quantity of moisture added, and (f) the slope of the material on the disc. It is desired to have the particles 6 of the same diameters or with diameters that lie within a certain given range.

Uniform particle diameters can be approached by varying the above-mentioned conditions, but the rolling speed of the individual particles sets a certain upper limit to the disc inclination. Because of this reason, the rotation speed of the disc and the output of the apparatus is limited. Consequently, the output of the apparatus can be raised only to a certain limit, if grains of an even size are required. If this limit is to be surpassed, the above mentioned variables have to be adjusted in such a way, that particles of uneven size are discharged.

In the formation of the granular particles, those with the smallest diameters gather on the bottom of the bed, while the larger size particles arrange themselves on top, as indicated in Figure 2. This automatic self-sorting of the particles is disturbed because of the unwanted remixing of the various size particles. In Figure 1, the contour lines $a$ to $g$, inclusive, show the approximate boundaries of the layers of grains of different size. Contour $a$ shows the area occupied by the largest particles 6 and contour $g$ the boundary of the area of the smallest particles. As indicated, the turning disc elevates the largest particles just a little before they start to roll back, but the smallest particles travel greater distances with the smallest of the particles reaching the scraper 4. As the particles of different sizes roll down, the smaller sizes group together and mix within the circular area A. This remixing can be diminished by reducing the speed of rotation of the disc and the rate of feed of raw material through chute 2. In the apparatus of Figure 1, the disc speed and rate of feeding raw material necessarily affects the output of the apparatus, and therefore the capacity of the apparatus with adequate self-sorting is limited. If this limit is exceeded, the smaller particles do not have a chance to drop to the bottom of the bed and the larger particles are carried beyond the range of their individual contours $a$ to $g$. The surface of the disc becomes roughened by sticky, not fully granulated material and thus carries along the larger grains.

Figure 3:
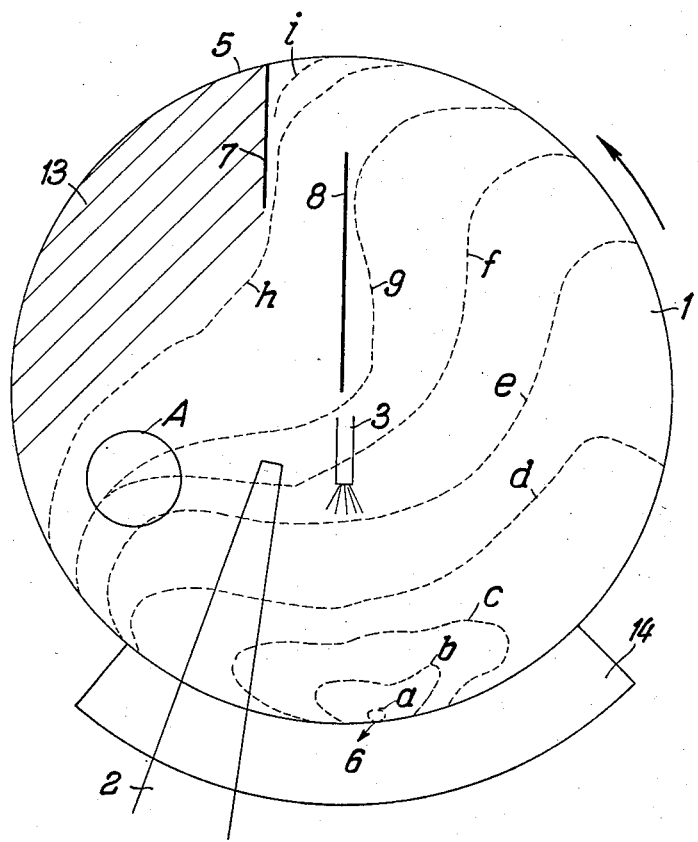
Figure 3 is a plan view of a disc according to the instant invention having two scraper blades.
Figure 4:
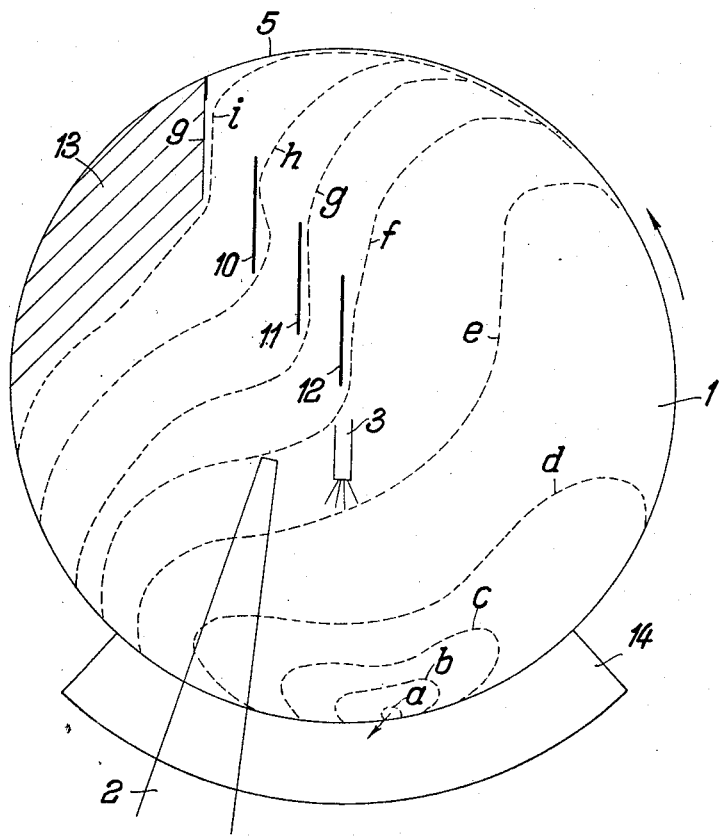
Figure 4 is a view similar to Figure 3 but showing four scraper blades.

As indicated in Figure 1, the individual groups of particles of different size do not roll downwardly parallel to scraper 4. The particles roll with a sidewise movement because of the circular movement of the disc. As the grains roll downwardly by gravity, the larger and heavier particles roll faster than the smaller particles and therefore reach the remixing zone A prior to the fines. As shown in Figures 3 and 4, this invention prevents the unwanted remixing by the use of a plurality of scraper blades. In Figure 3, two scraper blades 7 and 8 are used. Scraper 8 extends from adjacent the center of the disc radially toward, but short of, side wall 5 and scrapes the surface of the disc. This scraper functions to stop the passage of the larger size particles according to the contour line $g$. The finer particles continue past the outer end of scraper 8 and, as indicated by the line $h$, passes to the scraper 7 which also scrapes the surface of the disc and scrapes side wall 5. Scraper 7 is offset from scraper 8 in the direction of the rotation of the disc and extends parallel to scraper 8 in a chordwise direction across the disc. The material stopped by scraper 8 immediately begins to flow downwardly as well as the material stopped by scraper 7. However, the material rolled downwardly from scraper 7 has its own wide path without being mixed with the material from the group having contour $g$. Thus by dividing the single scraper 4 of Figure 1 into two scrapers 7 and 8 of Figure 3, the rotation speed of the disc can be raised, which results in that the granules in the groups according to contours $h$ and $i$ are carried to the scraper 7 rather than rolling down by gravity before reaching the vicinity of scraper 8. This increased disc speed naturally produces a higher output from the apparatus. This increased output can also be accomplished, instead of raising the disc speed, by lowering the inclination of the disc so that the particles will be carried to scraper 7. In the apparatus of Figure 3, which is inclined as shown in Figure 2, a reduction of two percent in inclination would be sufficient.

Because the small particles according to contour $h$ have a shorter path to area A than the grains of contour $g$, they reach area A. In this area, the danger of remixing of the particles is very great. However, the smaller particles will form the lowest layer next to the surface of the disc before the larger grains from contour group $g$ arrive. Thus the larger grains must rest as a superimposed layer. A small degree of remixing can only be effected by strongly overloading the disc, but such remixing will only be of the particles coming from groups $f$ and $g$ and not from contour groups $h$ and $i$.

In Figure 4, the scraper blades are divided into four parts 9, 10, 11, and 12. Thus scraper 9 extends from side wall 5 in a chordwise direction, while scrapers 10 and 11 are intermediate and extend parallel to the center reaching scraper 12. As before, each scraper blades scrapes the surface of disc 1. Scrapers 10, 11, and 12 leave paths for successively smaller particles to pass to scraper 9.

From the drawings, it can be seen that another advantage of the invention is that a larger portion of the surface of the disc is a usable working area for granulating. In conventional granulating discs, not more than appr. fifty percent of the disc surface is used, that is the surface area 13 of Figure 1 is almost 50 percent of the surface area of the disc. When two scraper blades are used as in Figure 3, the cleaned off, unused surface area 13 is only about 20 percent, and this unused area is reduced to less than 10 percent by means of the four scraper blades of Figure 4.

Another advantage of the invention is in that the discs with a plurality of scrapers are far less sensitive to operating conditions, particularly to changes in moisture content of the material to be treated, than discs with one scraper only. While in Figure 1, a small change in the amount of moistening of the particles produces a large change in the size of the largest particles produced, the instant invention permits a considerable change in the moisture content without affecting the particle size.

In the following table, a comparison is shown of the output of the same disc with the use of one, two, and four scraper blades. In each case, the same raw material was used, namely raw phosphate, Foiait, and limestone. The table shows that the four blade disc has an output of at least 258 percent greater than the single scraper disc.

*Table*

Output of the 80 cm. disc with three different sets of scraper blades, at a disc speed of 10 r.p.m.]

| | Inclination of Disc, percent | Output, 15 min. | | Particle Diameter | Moisture Content, percent | Output, kg./m.²h. |
|---|---|---|---|---|---|---|
| | | kg. | Percent | | | |
| One scraper | 42 | 40.5 | 100 | 6-8 | 9.8 | 324 |
| Two scrapers | 44 | 75 | 185 | 6-8 | 9.2 | 600 |
| Four scrapers | 44 | 104.5 | 258 | 6-8 | 9.5 | 836 |

The disc 1 used in this example had a diameter of 800 mm. and a wall 5 having a height of 190 mm. The raw material fed through chute 2 was composed of 53.5 parts of Brazil raw phosphate, 19.8 parts Foiait, and 25.6 parts of limestone ground to a fine powder. In each case, the disc was kept as full as possible according to the number of scrapers used. A continuous and uniform production of pellets was performed. With the above common basic features, the output of the apparatus with the weight and size of the output particles was checked every fifteen minutes. The granules produced ranged in size from 6-8 mm. with a few scattered particles of 10 mm. among them.

In all forms of the apparatus, the scraper blades were stationarily mounted above the surface of the disc in scraping engagement therewith.

A sharper separation of the groups of particle sizes can be accomplished if the individual scraper blades are set at an angle substantially corresponding to the angle of the contour lines for the individual groups, as for example, the contour lines $f$ to $i$ in Figure 4. The individual scraper blades can be straight or they can be curved to approximate the contour lines.

However, it is generally sufficient to mount the individual scraper blades parallel to each other, but advantages can be obtained by mounting each individual blade at an angle corresponding to the boundaries of the various circulation areas of the groups of particles.

It is, besides, of advantage to provide variable location of the chute (2) through which the fine grained particles are fed upon the granulating disc. For if it is intended to produce comparatively small-sized granules, the fines to be granulated are appropriately fed onto the small-sized ballshaped particles rolling down the disc, i. e. as per Fig. 3 onto the flow of particles rolling downwardly between scrapers 7 and 8, and as per Fig. 4 onto the flow of finest granules rolling down between and, as the case may be, aslant below scrapers 9 and 10. In case granules of somewhat larger size are required, the location of the chute should appropriately be more to the right so as to feed the fines onto the flows $h$, $g$, or $f$, rolling downwardly. To obtain specially large size granules, the chute is best located still more to the right, so as to feed the fines about onto the circulation areas $d$, $c$, $b$, $a$, depending on the required size of output particles.

Having now described the means by which the objects of the invention are obtained,

I claim:

1. An apparatus for agglomerating sticky fine grain particles into larger size granular particles comprising an inclined disc having a circumferential wall, means for rotating said disc, and a plurality of stationary scrapers mounted above said disc for contacting the particles carried on said disc, said scrapers being spaced from each other in the direction of rotation of said disc with the first scraper extending radially from the approximate center of said disc partway to said wall, and at least one other scraper spaced from said center and extending toward said wall.

2. An apparatus for agglomerating sticky fine grain particles into larger size granular particles comprising an inclined disc having a circumferential wall, means for rotating said disc, and a plurality of stationary scrapers mounted above said disc for contacting the particles carried on said disc, said scrapers being spaced from each other in the direction of rotation of said disc with the first scraper extending radially from the approximate center of said disc partway to said wall with at least one scraper being in scraping engagement with said wall.

3. An apparatus for agglomerating sticky fine grain particles into larger size granular particles comprising an inclined disc having a circumferential wall, means for rotating said disc, and a plurality of stationary scrapers mounted above said disc for contacting the particles carried on said disc, said scrapers being spaced from each other in the direction of rotation of said disc with the first scraper extending radially from the approximate center of said disc partway to said wall with at least one scraper being in scraping engagement with said wall, said first and other scraper being in scraping engagement with said disc to free from one-quarter to one-half of the surface of said disc from said sticky fine grain particles.

4. An apparatus for agglomerating sticky fine grain particles into larger size granular particles comprising an inclined disc having a circumferential wall, means for rotating said disc, and a plurality of stationary scrapers mounted above said disc for contacting the particles carried on said disc, said scrapers being spaced from each other in the direction of rotation of said disc with the first scraper extending radially from the approximate center of said disc partway to said wall, said scrapers being mounted parallel to each other with one of said scrapers extending to said wall.

5. An apparatus for agglomerating sticky fine grain particles into larger size granular particles comprising an inclined disc having a circumferential wall, means for rotating said disc, and a plurality of stationary scrapers mounted above said disc for contacting the particles carried on said disc, said scrapers being spaced from each other in the direction of rotation of said disc with the first scraper extending radially from the approximate center of said disc partway to said wall, and at least one other scraper spaced from said center and extending toward said wall, further comprising a feeding chute for the material to be granulated, said chute being so designed as to permit the fines to be fed at any point whatever of the granulating disc.

6. An apparatus for agglomerating sticky fine grain particles into larger size granular particles comprising an inclined disc having a circumferential wall, means for rotating said disc, and a plurality of stationary scrapers mounted above said disc for contacting the particles carried on said disc, said scrapers being spaced from each other in the direction of rotation of said disc with the first scraper extending radially from the approximate center of said disc part-way to said wall, and at least one other scraper spaced from said center and extending toward said wall, said scrapers overlapping each other.

References Cited in the file of this patent

UNITED STATES PATENTS 985,602    Jones ---------------- Feb. 28, 1911

FOREIGN PATENTS 915,072    Germany -------------- July 15, 1954